United States Patent
Chen et al.

(10) Patent No.: US 9,884,779 B2
(45) Date of Patent: Feb. 6, 2018

(54) BIOLOGICAL WASTEWATER TREATMENT AND REUSE UTILIZING SULFUR COMPOUNDS AS ELECTRON CARRIER TO MINIMIZE SLUDGE PRODUCTION

(75) Inventors: Guanghao Chen, Hong Kong (CN); Ho Kwong Chui, Hong Kong (CN); Hui Lu, Hong Kong (CN); Di Wu, Hong Kong (CN); Tianwei Hao, Hong Kong (CN); Feng Jiang, Guangzhou (CN); Marinus Cornelis Maria Van Loosdrecht, Den Haag (NL)

(73) Assignee: THE HONG KONG UNIVERSITY OF SCIENCE AND TECHNOLOGY, Kowloon, Hong Kong (CN)

( * ) Notice: Subject to any disclaimer, the term of this patent is extended or adjusted under 35 U.S.C. 154(b) by 262 days.

(21) Appl. No.: 13/991,053

(22) PCT Filed: Dec. 2, 2011

(86) PCT No.: PCT/CN2011/002019
§ 371 (c)(1),
(2), (4) Date: May 31, 2013

(87) PCT Pub. No.: WO2012/071793
PCT Pub. Date: Jun. 7, 2012

(65) Prior Publication Data
US 2013/0256223 A1    Oct. 3, 2013

Related U.S. Application Data

(60) Provisional application No. 61/344,984, filed on Dec. 2, 2010, provisional application No. 61/344,986, filed
(Continued)

(51) Int. Cl.
*C02F 3/00* (2006.01)
*C02F 3/02* (2006.01)
(Continued)

(52) U.S. Cl.
CPC ............ *C02F 3/025* (2013.01); *C02F 3/2846* (2013.01); *C02F 3/302* (2013.01);
(Continued)

(58) Field of Classification Search
CPC ........ C02F 3/302; C02F 2209/20; C02F 1/72; C02F 2101/101; C02F 2101/16; C02F 2101/30; C02F 3/12; C02F 3/30
(Continued)

(56) References Cited

U.S. PATENT DOCUMENTS 4,735,723 A * 4/1988 Mulder ..................... C02F 3/10
                                                    210/603
5,057,230 A * 10/1991 Race ..................... B01F 3/0446
                                                    210/221.2
(Continued)

FOREIGN PATENT DOCUMENTS

AU    2008244181    *  11/2008
CN    1092152 C        10/2002
(Continued)

OTHER PUBLICATIONS

Chen et al, "Simultaneous biological removal of sulfur, nitrogen and carbon using EGSB reactor", 2008, Appl Microbiol Biotechnol 78: pp. 1057-1063.*
(Continued)

*Primary Examiner* — Claire A Norris
(74) *Attorney, Agent, or Firm* — Nath, Goldberg & Meyer; Jerald L. Meyer; Stanley N. Protigal

(57) ABSTRACT

Biological wastewater treatment of wastewater is performed by oxidizing organic carbon with sulfur or a sulfur compound as an electron carrier, and reducing the sulfur or sulfur compound to sulfide. The sulfide is oxidized with nitrate or oxygen. If necessary, ammonia is oxidized to nitrate and then reduced to nitrogen gas. The process is effective for
(Continued)

saline waste water facilities, as well as non-saline waste water facilities.

17 Claims, 9 Drawing Sheets

Related U.S. Application Data on Dec. 2, 2010, provisional application No. 61/626,517, filed on Sep. 28, 2011, provisional application No. 61/626,519, filed on Sep. 28, 2011.

(51) Int. Cl.
*C02F 3/28* (2006.01)
*C02F 3/30* (2006.01)
*C02F 101/10* (2006.01)
*C02F 101/16* (2006.01)

(52) U.S. Cl.
CPC .... *C02F 2101/101* (2013.01); *C02F 2101/16* (2013.01); *C02F 2101/163* (2013.01)

(58) Field of Classification Search
USPC ................................ 210/605, 617, 624, 719
See application file for complete search history.

(56) References Cited

U.S. PATENT DOCUMENTS

| | | | |
|---|---|---|---|
| 6,217,766 B1 * | 4/2001 | Stetter et al. | 210/605 |
| 7,147,776 B2 * | 12/2006 | Krier | 210/605 |
| 2005/0252854 A1 | 11/2005 | Krier | |

FOREIGN PATENT DOCUMENTS

| | | |
|---|---|---|
| CN | 1671630 A | 9/2005 |
| CN | 101302069 A | 11/2008 |
| CN | 101585651 A | 11/2009 |
| CN | 101693574 A | 4/2010 |
| CN | 101734792 A | 6/2010 |
| CN | 101774692 A | 7/2010 |
| EP | 0 255 745 A1 | 2/1988 |
| JP | H05115897 A | 5/1993 |
| JP | 2000005795 A | 1/2000 |
| JP | 2004082107 A | 3/2004 |
| JP | 2004148242 A | 5/2004 |

OTHER PUBLICATIONS

Wang et al., "A novel sulfate reduction, autotrophic denitrification, nitrification integrated (SANI) process for saline wastewater treatment", Water Research, (2009), vol. 43, pp. 2363-2372.

Rao et al., "Microbial conversion of sulfur dioxide in flue gas to sulfide using bulk drug industry wastewater as an organic source by mixed cultures of sulfate reducing bacteria", Journal of Hazardous Materials, (2007), vol. 147, pp. 718-725.

Selvaraj et al., "Microbial Reduction of Sulfur Dioxide with Anaerobically Digested Municipal Sewage Biosolids as Electron Donors", Biotechnol. Prog., (1995), vol. 11, No. 2, pp. 153-158.

Chen et al., "Optimal process pattern for simultaneous sulfur, nitrogen and carbon removal", Water Science & Technology, (2009), vol. 59, No. 4, pp. 833-837.

Reyes-Avila et al., "Simultaneous biological removal of nitrogen, carbon and sulfur by denitrification", Water Research, (2004), vol. 38, pp. 3313-3321.

* cited by examiner

BIOLOGICAL WASTEWATER TREATMENT AND REUSE UTILIZING SULFUR COMPOUNDS AS ELECTRON CARRIER TO MINIMIZE SLUDGE PRODUCTION

This is a National Phase Application filed under 35 U.S.C. 371 of PCT/CN2011/002019, filed Dec. 2, 2011, which claims priority benefit under 35 USC 119(e) from US Provisional Patent Application No. 61/344,984, filed Dec. 2, 2010, and from US Provisional Application No. 61/344,986, filed Dec. 2, 2010, and from US Provisional Application No. 61/626,517, filed Sep. 28, 2011, and from US Provisional Application No. 61/626,519, filed Sep. 28, 2011, the content of each of which is hereby incorporated by reference in its entirety.

BACKGROUND

Water pollution due to organic pollution had been a major worldwide environmental issue, resulting in the development of biological carbon removal process, also known as secondary treatment, in the early $20^{th}$ century. Although the focus of sanitary researchers then shifted to the development of biological nutrient removal processes to tackle eutrophication problems, with many authorities setting guidelines and standards for controlling discharges of nitrogen and phosphorus to sensitive waters, the merits of secondary treatment cannot be overlooked. These include a shorter sludge age, a smaller reactor, simpler operations, and less foaming problems.

USEPA (1984) defines secondary treatment as having a discharge with 30-day average $CBOD_5$ and SS of 25 mg/L and 30 mg/L, respectively. With these operational and economic benefits, secondary treatment is still one of the most popular sewage treatment processes in the world, in particular, for discharges leading to less sensitive waters, e.g., oceanic waters, as well as for water reclamation.

One of the common applications for secondary treatment is the production of reclaimed water for irrigation. Irrigation accounts for 70% of the water consumption in the world. To conserve precious water resources, many cities have adopted a dual water supply system supplying freshwater and reclaimed water for various uses, such as crop and landscape irrigation. The minimum treatment level required for irrigation is secondary treatment plus disinfection. For the purpose of irrigation, secondary treatment is superior to biological nutrient removal as it not only costs less, but also retains nutrients as essential fertilizers.

Since the introduction of the activated sludge process in 1914, the biological process for organic carbon removal from wastewater in secondary treatment has remained the same for almost a decade. FIG. 1 is a schematic diagram depicting a conventional biological sewage treatment process for achieving carbon removal using a heterotrophic oxidation reactor. The process involves the heterotrophic oxidation of organic carbon to $CO_2$ and the conversion of the remaining organic carbon into sludge for removal at the secondary sedimentation tank.

To control eutrophication, nitrogen removal is necessary. The development of Biological Nitrogen Removal processes in the 1960s modified the process by introducing autotrophic nitrification and heterotrophic denitrification steps to the treatment process. FIG. 2 is a schematic diagram depicting a conventional biological sewage treatment process for achieving carbon and nitrogen removal using heterotrophic denitrification and autotrophic nitrification reactors. Since heterotrophic carbon oxidation and denitrification process has a high sludge yield factor, excess sludge wastage, handling and disposal from these processes are required.

Many countries have been relying on the reuse of treated sewage for providing water for various types of applications such as street and car washing, toilet flushing, landscape irrigation, environmental water, and groundwater replenishment. FIG. 3 is a diagram showing the operation of a typical sewage treatment and water reclamation plant. Generally, the minimum treatment for these types of water reuses is biological secondary treatment followed by a water reclamation plant involving sand/membrane filtration and disinfection. Nitrogen removal, i.e., nitrification and denitrification, can be provided if necessary.

The application of the water reuse system, however, is quite difficult in areas where seawater is used for toilet flushing as a means of water conservation, such as Hong Kong. This is because when seawater (containing a salt concentration of about 35,000 mg/L) was used to flush the toilets, and the sewage generated will become saline with a salt concentration of about 7000-10,000 mg/L. This high level of salt affects several types of water reuse options such as irrigation or groundwater replenishment. Nevertheless, as seawater also contains about 2600 mg/of sulfate, it provides the necessary sulfate ion as the electron carrier for the development of a new type of wastewater treatment process. This use of sulfate characterizes the SANI process.

SUMMARY

Biological wastewater treatment of influent containing organic carbon is implemented by oxidizing the organic carbon to carbon dioxide with sulfur or a sulfur compound as an electron carrier, and reducing the sulfur or sulfur compound to sulfide. The sulfide is then oxidized with oxygen or nitrate, and if the nitrate is to be reduced, reducing said nitrate to nitrogen gas.

BRIEF DESCRIPTION OF THE DRAWINGS

FIG. 16a shows granulation at 30 days. FIG. 16b shows granulation at 30 days as viewed from an x-ray microscope. FIG. 16c shows granulation at 60 days. FIG. 16d shows granulation at 90 days.

FIGS. 18a and 18b are charts showing performance of the autotrophic denitrification reactor. The influent and effluent nitrate concentrations, as well as nitrate removal efficiency are shown in FIG. 18a. FIGS. 18b shows total organic carbon (TOC) in the influent and effluent.

DETAILED DESCRIPTION

Figure 4:
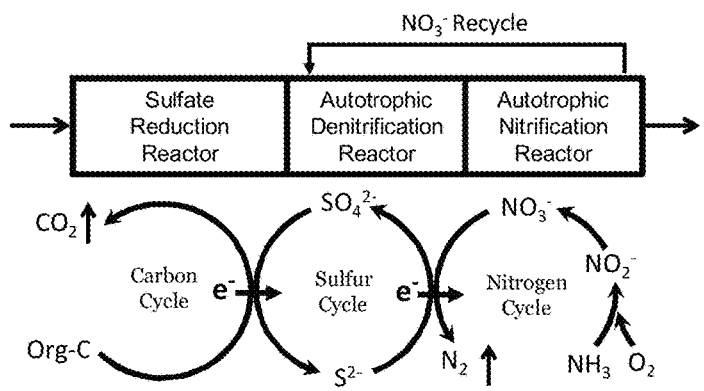
FIG. 4 is a schematic diagram depicting a sulfate reduction-autotrophic denitrification-nitrification integrated (SANI) process.

FIG. 4 is a schematic diagram depicting a sulfate reduction-autotrophic denitrification-nitrification integrated (SANI) process. The SANI process introduces the sulfur reducing and oxidation into the carbon and nitrogen cycle, which effectively minimizes sludge production from biological wastewater treatment.

Seawater contains 2,600 mg/L of sulfate as well as a salt concentration of 35,000 mg/L. Unlike the other parts of the world where freshwater is used for toilet flushing, Hong Kong is using seawater for toilet flushing as a means of water conservation. Seawater toilet flushing would cause the sewage saline with approximately 600 mg/L of sulfate as well as a salt concentration of approximately 7000 to 10,000 mg/L, which is approximately 20-30% saline as compared to seawater (35,000 mg/L). The disclosed techniques are useful in treatment of such saline wastewater by making use of the associated sulfate ion. The disclosed techniques are also useful for treatment of non-saline water through addition of sulfate from seawater or an industrial source.

The SANI process, as originally configured, relied on sulfate originating from seawater toilet flushing system as the electron carrier for biological carbon oxidation. The process used sulfate in seawater and sulfate-reducing bacteria to accomplish the oxidation of organic carbon to carbon dioxide, and autotrophic denitrification by converting sulfide to sulfate. Accordingly, nitrogen and carbon removal relied on the supply of sulfate from seawater for reducing sulfate to sulphide.

The present disclosure relates to an improved sulfate reduction-autotrophic denitrification-nitrification integrated (SANI) process. Still referring to FIG. 4, in the SANI process, sulfate originating from seawater is used to oxidize organic carbon to $CO_2$ while sulfate is reduced to dissolved sulfide by sulphate-reducing bacteria in the first reactor. On the other hand, ammonia nitrogen is oxidized by oxygen to nitrate in the third reactor by autotrophic nitrifiers. The nitrate will then be recycled to the second reactor to react with sulfide and converted into nitrogen gas by autotrophic denitrifiers while sulfide is converted back to sulfate. The three key biological chemical processes all produce minimal sludge as shown in the following equations:

Heterotrophic Sulfate Reduction:

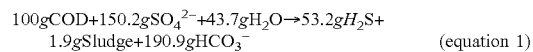

$$100gCOD + 150.2gSO_4^{2-} + 43.7gH_2O \rightarrow 53.2gH_2S + 1.9gSludge + 190.9gHCO_3^- \quad \text{(equation 1)}$$

Autotrophic Sulfide Oxidation and Denitrification:

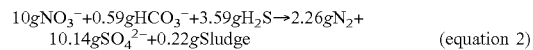

$$10gNO_3^- + 0.59gHCO_3^- + 3.59gH_2S \rightarrow 2.26gN_2 + 10.14gSO_4^{2-} + 0.22gSludge \quad \text{(equation 2)}$$

Autotrophic Nitrification:

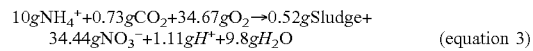

$$10gNH_4^+ + 0.73gCO_2 + 34.67gO_2 \rightarrow 0.52gSludge + 34.44gNO_3^- + 1.11gH^+ + 9.8gH_2O \quad \text{(equation 3)}$$

Figure 5:
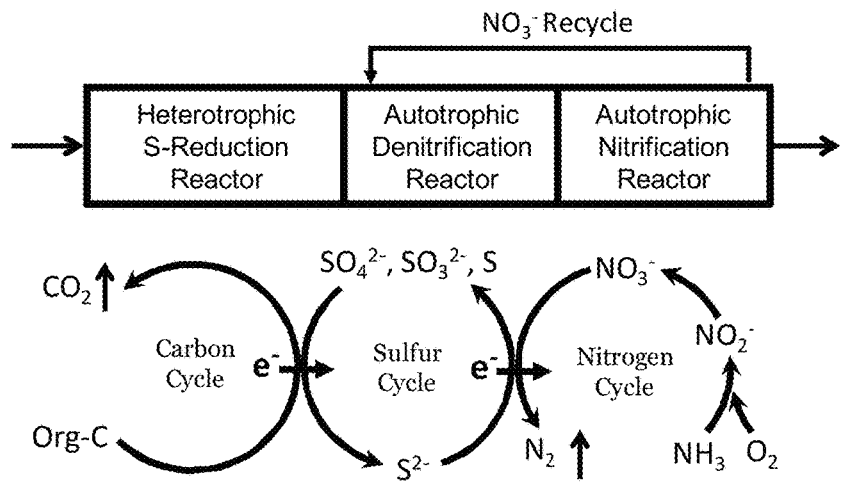
FIG. 5 is a schematic diagram depicting a three-cycle SANI process.

FIG. 5 is a schematic diagram depicting a three-cycle SANI process. As seawater or sulfate is not always available, the presently disclosed techniques modify the SANI process to a three-cycle SANI process such that it can make use of other sulfur compounds including sulfite, thiosulfate or elemental sulfur, as the electron carrier to transfer the electron from organic carbon to oxygen through heterotrophic sulfur reduction, autotrophic denitrification and autotrophic nitrification. In the three-cycle SANI process, sulfite, thiosulfate and elemental sulfur oxidation and reduction cycle is introduced into the carbon and nitrogen cycles of the process. These sulfur compounds are used as the electron carrier to pass the electron from organic carbon to oxygen through heterotrophic sulfur reduction, autotrophic denitrification and autotrophic nitrification.

As shown in FIG. 5, the three-cycle SANI process has the following biological processes:

In the first reactor, electrons flow from organic carbon to sulfur by means of the sulfate-reducing bacteria. The sulfur compound reduces to sulfide while organic carbon oxidizes to $CO_2$ at the same time through heterotrophic sulfur reduction. The sulfide formed will then flow to the second reactor.

In the second reactor, electrons flow from sulfide to nitrogen by means of the autotrophic sulfur oxidation/denitrification bacteria. Sulfide oxidizes to sulfate while nitrate reduces to nitrogen gas through autotrophic denitrification.

In the third reactor, electrons flow from ammonia to oxygen by means of the autotrophic nitrification bacteria. Ammonia is oxidized to nitrate through autotrophic nitrification which is then recycled back to the second reactor to accomplish the autotrophic denitrification step.

Through the three-cycle SANI process, it is possible to achieve biological nitrogen removal and sludge minimization with not only sulfate, but also sulfite, thiosulfate or elemental sulfur.

Figure 6:
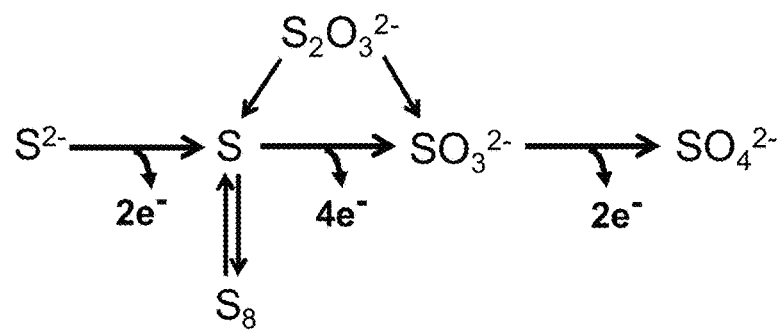
FIG. 6, is a representation of biological reactions in the oxidation of sulfur compounds.

This configuration takes advantage of the use of multiple sulfur oxidation and reduction processes for accomplishing the sulfur reduction and autotrophic denitrification. A significant biological sulfur oxidation processes involved in the oxidation of sulfur compounds undergoing autotrophic denitrification is shown in FIG. 6, representing equation 4. The reverse of these reactions; i.e., the reduction of the oxidized sulfur compounds, are conducted by the sulfur-reducing bacteria. Depending on the reactor design, the three-cycle SANI process can be operated as an activated sludge system, a separate sludge system using attached growth bio-filters, a sequencing batch reactor, a membrane bioreactor, an upflow sludge bed system or a moving bed reactor.

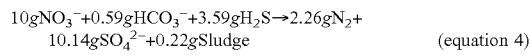

$$10gNO_3^- + 0.59gHCO_3^- + 3.59gH_2S \rightarrow 2.26gN_2 + 10.14gSO_4^{2-} + 0.22gSludge \quad \text{(equation 4)}$$

The other disclosed biological processes, namely, heterotrophic sulfur reduction, autotrophic denitrification and autotrophic nitrification, all have very low sludge yield. The three-cycle SANI process produces minimal biological solid waste which practically eliminates the need for sludge disposal, which amounts for up to 50% of the sewage treatment cost and reduces about ⅓ of energy consumption and greenhouse gas emission.

A comparison of the SANI process and the three-cycle SANI process can be seen in a comparison of FIGS. 4 and 5. The SANI process (FIG. 4), as it was named, relies on the sulphate ion as the electron carrier. As compared with SANI, the three-cycle SANI process (FIG. 5) makes use of many types of sulfur compounds including sulphate, sulfite, thiosulfate and elemental sulfur as the electron carrier to accomplish carbon and nitrogen removal. This development largely extended the operation of the original SANI process to make use of other sulfur sources from various kinds of waste streams, e.g., from flue gas desulfurization effluent from incinerators.

Figure 7:
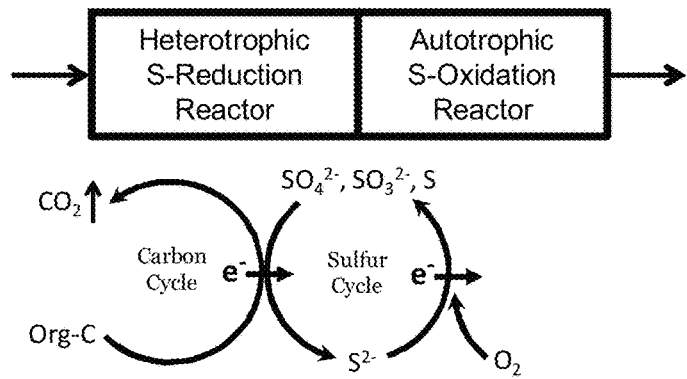
FIG. 7 is a schematic diagram depicting a modification of the SANI process called the simplified SANI process.

A modification of the disclosed three-cycle SANI process is useful in cases where nitrogen removal is not required. FIG. 7 is a schematic diagram depicting a modification of the SANI process called the simplified SANI process. As nitrogen removal is not always required as discussed above, a simplified SANI process was developed. In the simplified SANI process, the sulfur oxidation and reduction cycle was combined with the carbon oxidation cycle. Similar to the three-cycle SANI process, sulfur compounds in various forms, such as sulphate, sulfite, thiosulfate and elemental sulfur, can be used as the electron carrier to transfer the electron from organic carbon to oxygen through sulfur reduction and autotrophic sulfur oxidation. The Simplified SANI process is useful in providing biological carbon removal, or secondary treatment, while at the same time minimizing sludge production.

As shown in FIG. 7, in the first reactor, electrons flow from organic carbon to sulfur by means of the sulfur-reducing bacteria. The sulfur compounds are reduced to sulfide while organic carbon is oxidized to $CO_2$ at the same time. The sulfide formed then flows to the second reactor where electron will flow to oxygen through autotrophic sulfur-oxidation bacteria with sulfide oxidized.

As compared to the SANI process, the simplified SANI process waives the need for a denitrification reactor. Although the denitrification reactor is not present, the simplified SANI process can accommodate autotrophic nitrification for the conversion of ammonia to nitrate in the second reactor if the removal of the toxic ammonia is needed.

The conceptual design and electron flow of the simplified SANI process is implemented with the following biological processes:

In the first reactor, electrons flow from organic carbon to sulfur. Sulfur compound reduces to sulfide while organic carbon oxidizes to $CO_2$ through heterotrophic sulfur reduction. The sulfide formed will then flow to the second reactor.

In the second reactor, electrons flow from sulfide to oxygen, with oxidation of sulfide under the autotrophic sulfide oxidation process.

Figure 1:
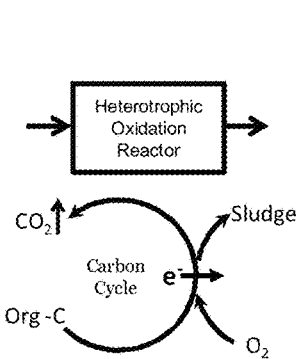
FIG. 1 (prior art) is a schematic diagram depicting a conventional biological sewage treatment process for achieving carbon removal using a heterotrophic oxidation reactor.

A comparison of conventional treatment and a simplified SANI process can be seen in a comparison of FIGS. 1 and 7. As compared to conventional secondary treatment, the simplified SANI process incorporates a sulfur cycle for organic carbon oxidation. Although both simplified SANI and SANI make use of the heterotrophic sulfur reduction process for oxidation of organic carbon to carbon dioxide, the oxidation of sulfide was conducted by a completely different process. As compared to the SANI process, the simplified SANI process has eliminated the nitrogen cycle from the SANI process. In the SANI process, oxidation of sulfide is conducted by autotrophic denitrification, with electrons flowing from sulfide to nitrate and converting nitrate to nitrogen, and indirectly passing to oxygen through autotrophic nitrification. In the simplified SANI process, oxidation of the sulfide is conducted by autotrophic sulfide oxidation by oxygen, with electrons flowing from sulfide to oxygen directly without passing through nitrate.

A further modification of the proposed three-cycle SANI process provides a sulfur reducing and autotrophic sulfide oxidation granular sludge bed reactor.

As in all biological wastewater treatment processes, the efficiency of the three-cycle SANI and Simplified SANI processes is highly dependent on the concentration of active biomass in this reactor. To improve the efficiency and effectiveness of the system, an upflow anaerobic sulfate reducing granular sludge bed reactor and an upflow autotrophic denitrification granular sludge bed reactor were developed. These two reactors are intended to speed the entire treatment process.

Figure 8:
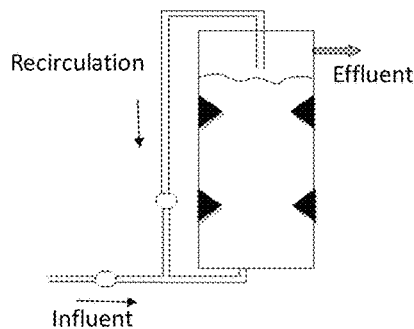
FIG. 8 is a schematic diagram showing a sulfur-reducing granular sludge bed reactor.

FIG. 8 is a schematic diagram showing a sulfur-reducing granular sludge bed reactor used in the conversion of organic carbon to $CO_2$ and sulfur compounds to sulfide. As sulfate is on the highest oxidation state in the sulfur reducing process as shown in the reaction of FIG. 6, this reactor is also applicable for reducing other sulfur compounds such as sulfite, thiosulfate and elemental sulfur.

By arranging a high upflow velocity and providing adequate agitation through maintaining an artificial turbulence inside the reactor, the biomass in the reactor will form high density granules. As the concentration of granular sludge is much higher than that of a conventional complete mix reactor, the granular sludge bed system can significantly reduce the size of the treatment plant.

Although granular sludge bed reactors have been applied in other sewage treatment processes, this process is completely different from the other granular sludge bed systems. Significant differences are (i) the biological processes involved are completely different, (ii) the bacteria involved are completely different, (iii) there is no gas phase involved in the sulfate reduction reaction while gaseous agitation and mixing are involved in all the other granular sludge bed reactors. These differences are illustrated in detail in the following:

The Upflow Anaerobic Sludge Blanket (UASB) Reactor provides an anaerobic fermentation process. The significant process involved in the UASB Reactor is the formation of methane gas through anaerobic fermentation. The organic materials undergo a disproportionate reaction. Moreover, the bacteria involved are fermentative bacteria as well as methanogenic bacteria. In this reactor, the mixing of the wastewater and washing out of the sludge relies heavily on the agitation caused by the formation of methane gas.

Anaerobic Degradation Process:

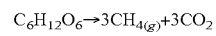

$$C_6H_{12}O_6 \rightarrow 3CH_{4(g)} + 3CO_2 \quad \text{equation 5}$$

The Granular Activated Sludge Reactor provides oxidation of organic carbon. The oxidation of organic carbon is accomplished in this reactor by addition of air. The biological process was conducted by heterotrophic carbon oxidation bacteria. The addition of air provides a strong agitation system for mixing as well as washing out of the sludge:
Aerobic Degradation Process:

$$C_6H_{12}O_{6(aq)}+6O_{2(g)} \rightarrow 6CO_{2(g)}+6H_2O_{(l)} \qquad \text{equation 6}$$

The Granular Anammox Reactor provides a reaction conducted by the anammox bacteria. A large amount of nitrogen gas is produced to provide agitation, mixing and washing out of the sludge from the reactor:
Anammox Reaction:

$$NO_2^-{}_{(aq)}+NH_{3(aq)}+H^+{}_{(aq)} \rightarrow N_{2(g)}+2H_2O_{(l)} \qquad \text{equation 7}$$

The Sulfur Reducing Granular Sludge Bed Reactor performs oxidation of organic carbon. The oxidation of organic carbon is accomplished by the addition of sulfur compounds, using sulfur reducing bacteria. As the reaction involved converting a strong acid (i.e., sulfate) to a weak acid (i.e., sulfide), the pH increased after the reaction, therefore keeping both carbon dioxide and sulfide completely dissolved. Hence, there is no gas phase involved in the reaction. Mixing is therefore entirely controlled by the liquid phase. Furthermore, the specific growth rate of the sulfate reducing bacteria is so low that there is no need for continuous washing out of the sludge, as compared with the aerobic sludge or fermentation process.
Sulfate Reduction Process:

$$C_6H_{12}O_{6(aq)}+3SO_4^{2-}{}_{(aq)} \rightarrow 6CO_{2(aq)}+6H_2O_{(l)}+3S^{2-}{}_{(aq)} \qquad \text{equation 8}$$

Instead of having a gas phase for providing mixing in the aerobic oxidation or anaerobic methane forming reactors, the sulfate reduction reaction does not involve any gas phase operation. Hence, the sulfur reducing reactor has to rely solely on the liquid flow to provide mixing between the substrate and the sludge as well as to provide the required turbulence for washing out the unwanted sludge for granulation. Moreover, as there is no gas phase, there is no need to provide a three phase (i.e. gas/liquid/solid) separator as in the anaerobic methane forming granular sludge bed system.

In the design of the upflow sulfur reducing granular sludge bed reactor, two specific features have been incorporated, including the use of a recirculation pump to increase the vertical liquid velocity in the reactor, and a flow restriction device to generate turbulence within the reactor.

In a laboratory reactor, a triangular baffle was used along the circumference of the reactor as the flow restriction device. With these two features, it is possible to increase the vertical velocity of liquid at the baffle with up to five times the velocity of the influent flow. This significantly enhanced the sludge movement in the reactor. Apart from providing the necessary mixing of sewage chemical oxygen demand (COD), sulfate ion and biomass, these features also enable washing out of unwanted fluffy sludge as well as generating a shear force to enhance the biomass growth into dense and strong sludge granules.

Similar to the sulfur reducing granular sludge bed reactor, the efficiency of the biological autotrophic sulfide oxidation granular sludge bed reactor is also highly dependent on the concentration and activity of biomass in the reactor. An upflow autotrophic sulfide oxidation granular sludge bed reactor was used to accomplish this. In order to improve the efficiency and effectiveness of the three-cycle SANI and simplified SANI processes, an upflow autotrophic sulfide oxidation granular sludge bed reactor was developed. The upflow autotrophic sulfide oxidation granular sludge bed reactor uses the same design features to speed up the entire treatment process. This reactor can perform autotrophic sulfide oxidation through two mechanisms: (a) with oxygen as electron acceptor as shown in equation 9, and (b) with nitrate as electron acceptor as shown in equation 10. As nitrogen gas is produced, a three-phase (i.e., gas-liquid-solid) separator may be added at the top of the reactor where necessary.

Although granular sludge bed reactors have been applied in other sewage treatment processes, this process is different from the other granular sludge bed systems as (i) the biological processes involved are completely different, and (ii) the bacteria involved are completely different. These differences are illustrated in detail in the following:

In the autotrophic sulfide oxidation process, the biochemical reaction involved is as follows:
With Oxygen Supply:

$$S^{2-}+2O_2 \rightarrow SO_4^{2-} \qquad \text{equation 9}$$

or
With Nitrate Supply:

$$5S^{2-}+8NO_3^-+4H_2O \rightarrow 5SO_4^{2-}+4N_2+8OH^- \qquad \text{equation 10}$$

In the conventional treatment process, the denitrification or oxidation processes are conducted by heterotrophic process, i.e., in both, the electron donor is from organic carbon. The bacteria involved are heterotrophic bacteria and their carbon source for metabolism is from organic material. However, in the autotrophic processes, the electron donor is from sulfide. The carbon source is from carbon dioxide and the bacteria involved are autotrophic bacteria.

A further modification of the proposed three-cycle SANI process uses the addition of a sulfate ion, which may be obtained from seawater. This modified technique is referred to as a heterotrophic oxidation SANI process.

Apart from Hong Kong where seawater is used for toilet flushing, the majority of the world is using freshwater for toilet flushing. Due to the absence of seawater, the wastewater generated from these areas does not contain high salt content. Therefore, their wastewater, after conventional secondary treatment (or known as heterotrophic oxidation in scientific term) plus filtration and disinfection, can be reused for various purposes including irrigation and groundwater replenishment.

As freshwater, instead of seawater, is used for toilet flushing in these areas, sulfate is not present in the wastewater. As the SANI process relies on sulfate as the electron carrier, there is a need to add sulfur compounds to the wastewater influent to support the sulfur reduction and oxidation processes. However, the addition of sulfate ion (mainly by means of addition of seawater) may contaminate the treated effluent by increasing the salt content and sacrifices many water reuse options such as irrigation and groundwater replenishment. To avoid contaminating the treated wastewater for water reuse while at the same time making use of the SANI process for biological wastewater treatment with minimized sludge production, a modified process has been developed, called a heterotrophic oxidation and sulfate reduction autotrophic denitrification and nitrification integrated (heterotrophic oxidation SANI) process.

In most of the water reuse applications, the amount of reclaimed water required is about ⅓ of the total sewage inflow. For example, in Florida where wastewater reuse is one of the most extensive worldwide, the amount of water reuse represents only about 43% of the sewage treated. Hence, it is possible to make use of this difference to separate the wastewater inflow into two streams, i.e., the first one (⅓ of flow) with conventional biological treatment without addition of sulfur compounds for water reuse while the second one (⅔ of flow) with SANI process by the addition of sulfur compounds such as seawater for sludge minimization. The proportion of the two streams would depend on the demand of water reuse with a view to minimize the treatment cost.

Figure 2:
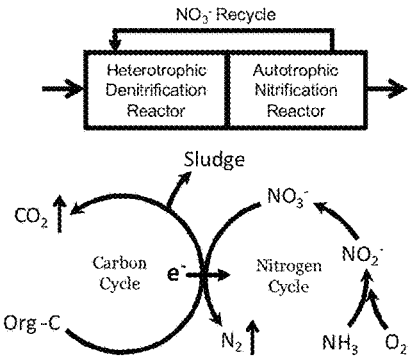
FIG. 2 (prior art) is a schematic diagram depicting a conventional biological sewage treatment process for achieving carbon removal using heterotrophic denitrification and autotrophic nitrification reactors.
Figure 3:
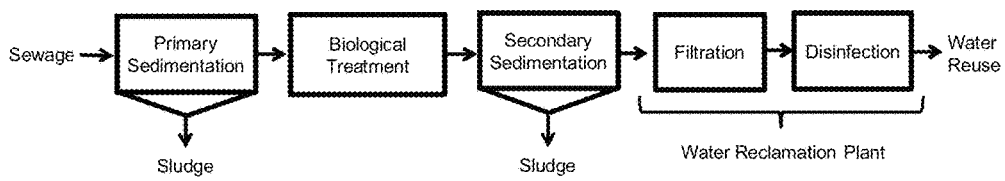
FIG. 3 is a diagram showing the operation of a typical sewage treatment and water reclamation plant.
Figure 9:
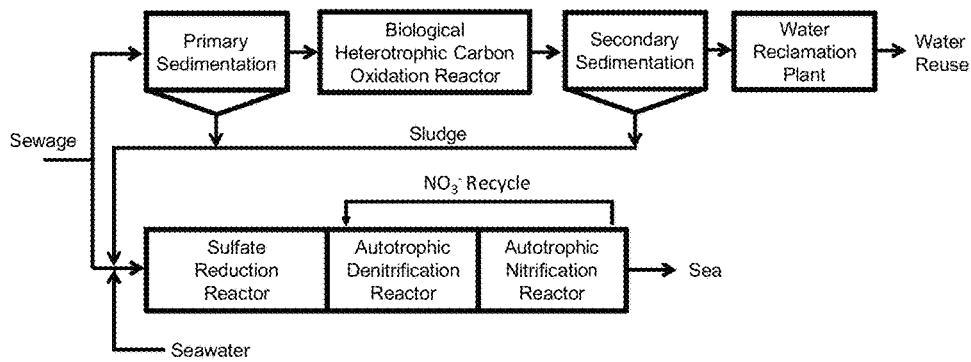
FIG. 9 is a schematic diagram showing a heterotrophic oxidation SANI process.

FIG. 9 is a schematic diagram showing a heterotrophic oxidation SANI process with a conventional heterotrophic oxidation process integrated with the SANI process by making use of an external sulfur source. As the amount of treated effluent required for water reuse is less than ⅓ of the total sewage inflow, it is possible to separate the sewage inflow into two streams. The first stream (about ⅓ of the total sewage flow) enters a conventional biological treatment process utilizing heterotrophic carbon oxidation as illustrated in FIG. 1 and FIG. 2, without the addition of sulfur compounds. The effluent can then be pumped to a water reclamation plant for producing reclaimed water for various types of reuses. The sludge coming out of the primary and secondary sedimentation tanks of this stream can then be transferred to the other stream and combined with the remaining sewage (i.e., ⅔ of the total flow) for co-treatment by the SANI process. To provide the sulfate source for the SANI process, it is possible to extract seawater and mix it with the sewage inflow. Seawater is a reliable and inexpensive source of sulfate. The only additional cost required is pumping. Nevertheless, the pumping cost is minimal as compared with the savings arising from the minimization of sludge handling processes. For areas where seawater is not available, alternative sources of sulfur from industrial wastewater, e.g., acid mine drainage or sulfite originating from the desulfurization unit of fossil fuel power stations, can be used.

The heterotrophic oxidation SANI process can produce an uncontaminated treated wastewater from the first stream for various types of water reuses such as groundwater replenishment and irrigation, while at the same time making use of the sulfur cycle in the second stream for sludge minimization. In sewage treatment process terms, the heterotrophic oxidation SANI process features:

In comparison with conventional wastewater treatment technology, both primary and secondary sludge generated from the heterotrophic oxidation step in the first stream is digested in the sulfate reducing reactor, instead of being digested in the methane forming sludge digester or incinerated.

In comparison with the SANI process—there were three major changes:

1) The SANI process is designed to treat sewage directly. In the heterotrophic oxidation SANI process, it also treats primary and secondary sludge.
2) The SANI process makes use of sulfate originated from seawater toilet flushing system, i.e., in the incoming sewage. In the heterotrophic oxidation SANI process, the sulfate comes from an external source, e.g., direct abstraction from the sea.
3) The SANI process produces effluent that contains elevated levels of sulfate and/or salt which would limit the options for water reuse; e.g., irrigation. However, the heterotrophic oxidation SANI produces part of the effluent that contains low levels of sulfate and salt, which enables various types of water reuse options.

The heterotrophic oxidation SANI process separates the treatment of sewage into two streams, water reuse and effluent discharge. This enables the adaption of different effluent standards and hence different treatment levels for the two streams for process optimization. For example, it is possible to eliminate nitrogen removal in the water reuse stream but provide nitrogen removal in the effluent discharge stream, or vice versa.

Figure 10:
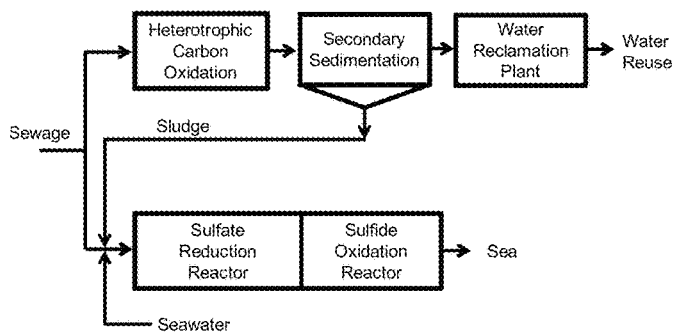
FIG. 10 is a schematic diagram showing a simplified heterotrophic oxidation SANI process.
Figure 11:
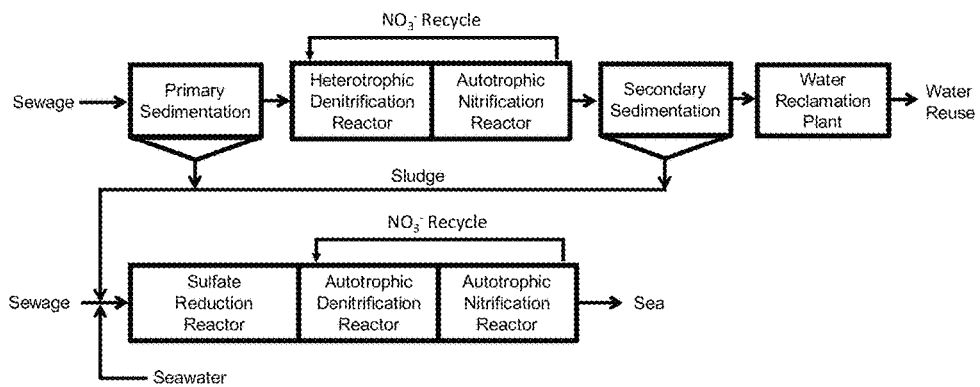
FIG. 11 is a schematic diagram showing an extended heterotrophic oxidation SANI process.

FIG. 10 is a schematic diagram showing a simplified heterotrophic oxidation SANI process. Where nitrogen removal is not needed for discharges to the environment, it is possible to simplify the SANI step in the second stream by eliminating the denitrification step into the Simplified SANI Process. It is possible to further simplify the design of the heterotrophic oxidation step by eliminating the primary sedimentation tank of the first stream, as shown in FIG. 10, or even replacing the first stream by a membrane bioreactor.

Where nitrogen removal is needed for certain types of water reuse, for example, groundwater replenishment, it is possible to extend the first stream by adding a conventional nitrogen removal process. Additionally, a phosphorus removal process can be included. FIG. 11 is a schematic diagram showing an extended heterotrophic oxidation SANI process.

As compared to conventional biological treatment processes, these new SANI processes and designs make use of the sulfur compounds (including sulfate, sulfite, thiosulfate and elemental sulfur) as electron carriers for the oxidation of organic carbon to carbon dioxide. As both sulfur-reduction and autotrophic sulfur-oxidation processes have very low sludge yield factor, the sludge production rate of the SANI process is much lower than conventional biological treatment. It effectively minimizes the need for sludge wastage, which requires sludge handling and disposal.

Sludge thickening, digestion, dewatering and disposal facilities usually represent 40-60% of the construction cost of sewage treatment plants, and accounts for 50% of the operating cost. As SANI process effectively eliminated the need for sludge handling and disposal, it can reduce the overall cost by 50%. Moreover, as sludge dewatering and incineration is energy consuming, it is estimated that, by eliminating the sludge handling and incineration process with SANI process, it would result in about one third of energy saving and greenhouse gas emission reduction as compared with conventional biological nitrogen removal process.

As the three-cycle SANI, simplified SANI and heterotrophic oxidation SANI processes mainly involve the development of a new biological process, these processes can be applied to various types of reactor designs, such as activated sludge, membrane bioreactor, sequencing batch reactor, biotower, biological aerated filter or moving bed bioreactors.

Furthermore, with the SANI process operating with an upflow sulfur reducing granular sludge bed reactor and upflow sulfur oxidizing granular sludge bed reactor or an aerobic filter for sulfide oxidation, it is possible to eliminate the need for primary sedimentation and secondary sedimentation as compared with conventional biological treatment. However, the downside of removing the primary sedimentation tank is that it may result in extending the hydraulic retention time for the SANI process.

Benefits of the Three-Cycle SANI Process

As compared with the original SANI process, the three-cycle SANI process extends the application for using not only sulfate, but also sulfite, thiosulfate and elemental sulfur as the electron carrier. This makes the application of the SANI process more flexible to allow for users far away from the sea. For example, sulfite, which is abundant in the desulfurization effluent from incinerators, or elemental sulfur, which is an inexpensive by-product of many industries, can be used to provide the electron carrier for the process.

If there is no need to provide nitrogen removal, it would be natural to implement the simplified SANI process instead of the SANI process. As compared with the SANI process, the simplified SANI process eliminates the anoxic bioreactor in which autotrophic denitrifiers reduce nitrate into nitrogen gas with sulfide as the electron donor. This would result in the reduction of ¼ of the total number of reactors, and hence effectively reduce around 25% of the operating cost and space requirement of the SANI process.

As compared with conventional secondary treatment, the present arrangement of the simplified SANI process with a Sulfate Reducing Upflow Sludge Bed (SRUSB) and an Aerobic Filter (AF) eliminates the need for primary treatment, secondary clarifier. Moreover, with the simplified SANI process, it is possible to eliminate all the sludge handling and disposal requirements, resulting in an overall cost reduction of 50%. The simplified SANI process can also be operated in other modes such as activated sludge, sequencing batch reactor, biotower, biological aerated filter, membrane bioreactor or moving bed bioreactors.

The sulfur reducing granular sludge bed reactor and the autotrophic sulfide oxidizing granular sludge bed reactor are beneficial in that they provide an increase in efficiency. The efficiency of the system is highly dependent on the concentration of active biomass in the reactor. A benefit of the granular sludge bed reactor is the increase in efficiency and hence less space requirement. As compared to the conventional suspended growth reactor or flocculating sludge bed reactor, the granular sludge bed reactor has a much higher sludge concentration. The efficiency of the reactor is therefore largely enhanced, resulting in a much shorter hydraulic retention time, such that a smaller treatment plant is technically feasible.

Due to the superior sludge settling characteristics, the granules tend to separate from effluent easily, resulting in much cleaner effluent than in the flocculating sludge bed system or suspended growth system. This enables the possibility of not having a separate sedimentation tank for the system. Furthermore, as the sludge granules are strong and dense, they are able to sustain higher hydraulic shock loads.

A major benefit of the heterotrophic oxidation SANI process is that it can make use of the SANI process to minimize sludge production, while at the same time maintain a stream of uncontaminated treated wastewater for various types of reuse such as irrigation and groundwater replenishment. As mentioned, by making use of the SANI process, it can reduce ⅓ of energy consumption and ⅓ of greenhouse gas emission. The only additional cost is seawater pumping. However, this is very minimal when compared with savings arising from sludge minimization.

Another benefit of the heterotrophic oxidation SANI process is the possibility for process optimization through selection of different treatment levels to meet the needs. Many applications, e.g., street and car washing, toilet flushing and irrigation, do not need nitrogen removal. In fact, retaining the nitrogen in the reclaimed water is beneficial to plants when irrigation is required. On the other hand, nitrogen removal may be required for effluent discharge to avoid eutrophication and algal blooms. The two requirements are sometimes contradictory and the usual practice is to apply a higher level of treatment, but this would increase the operation cost.

With the heterotrophic oxidation SANI process, it is possible to adopt biological carbon removal instead of nitrogen removal in the first stream for providing reclaimed water for irrigation purposes. Nitrogen removal will then be conducted in the second stream through the SANI process. This arrangement in a conventional heterotrophic oxidation process is sometimes difficult unless an additional carbon source, e.g., methanol, is added. This is because the denitrification step for conventional treatment is kinetically controlled by the amount of organic carbon in sewage.

Figure 12:
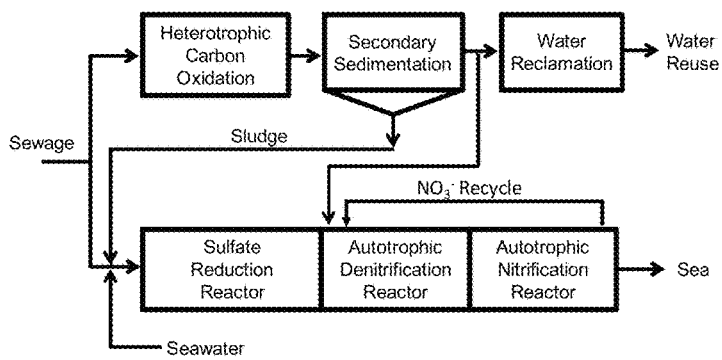
FIG. 12 is a schematic diagram showing possible modifications of the heterotrophic oxidation SANI process.

On the other hand, denitrification in the SANI process is an autotrophic process. It does not require a carbon source. Hence, the denitrification potential for the SANI process doubles that of conventional biological nitrogen removal processes. The heterotrophic oxidation SANI process therefore can provide complete denitrification without the need for additional carbon source. FIG. 12 is a schematic diagram showing possible modifications of the heterotrophic oxidation SANI process. By eliminating nitrogen removal, and perhaps the primary sedimentation tanks, for the first stream, it is possible to further reduce the size and the operation cost of the first stream without also increasing the size and operation cost for the second stream. When the demand for water reuse reduces, the surplus treated wastewater from the first stream can be pumped to the autotrophic denitrification reactor in the second stream for nitrogen removal. Through this arrangement, it is possible to not only minimize the size and cost of the system, but also retain the nutrients required for irrigation.

By the above techniques, it is possible to not only extend the application of the SANI process to the coastal areas where seawater toilet flushing is not used, but also introduced a large range of options for meeting the effluent discharge and water reuse needs requirements whilst at the same time allow for process optimization of the SANI process.

EXAMPLE 1

Three-Cycle SANI Process

To test the operation with a sulfate/sulfide/sulfate cycle, a pilot trial of the SANI process was conducted at the Tung Chung Sewage Pumping Station of Hong Kong, treating real saline sewage arising from the airport island and a domestic development of 83,000 residents. The pilot plant was composed of a Sulfate Reducing Upflow Sludge Bed (SRUSB) reactor and two upflow Aerobic/Anoxic Filter (AF) reactors. The SRUSB was an air-tight anaerobic bioreactor, and had 1.6 m diameter, 4.2 m height and an effective liquid volume of 6.8 m$^3$. The AF, packed with plastic media (specific area of 115 m$^2$/m$^3$), had 1.6 m diameter, 4.4 m height and an effective liquid volume of 3.9 m$^3$. The SRUSB and AF were seeded and inoculated, respectively, with anaerobic digester sludge (MLSS-8000 mg/L) and recycle activated sludge (MLSS~0.4000 mg/L) taken from a local secondary saline sewage treatment plant.

Figure 13:
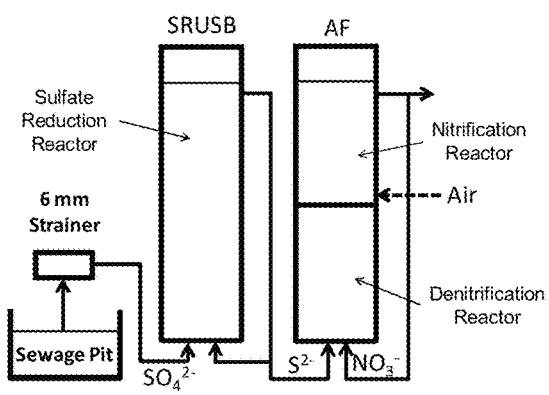
FIG. 13 is a diagram showing the design of a pilot plant for the SANI Process.

A 6 mm strainer was used to produce screened sewage from a sewage pit. The screened sewage, without passing through any other primary treatment facility, was fed to the SANI pilot plant by a constant feed pump at 10 m$^3$/day. FIG. 13 is a diagram showing the design of the pilot plant. The design and operating parameters of the pilot plant can be found in Table 1:

TABLE 1

Design and Operation Parameters of the Pilot Plant

| Reactor | HRT (θ) | Sludge Age ($\theta_c$) | Average MLSS |
|---|---|---|---|
| Sulfate Reducing USB Reactor | 16 hr | 90 days | 8000 mg/L |
| Anoxic Autotrophic Denitrifying AF Reactor | 5 hr | 110 days | not measured |
| Aerobic Autotrophic Nitrifying AF Reactor | 5 hr | 42 days | not measured |

The influent saline sewage was characterized regularly through a 24-hr composite sampler and summarized in Table 2. The characteristics of influent organics was determined as consisting of 8.0% of volatile fatty acid, 21.5% of biodegradable soluble organics, 7.1% of non-biodegradable soluble organics, 50.5% of biodegradable particulate organics and 12.9% of non-biodegradable particulate organics:

TABLE 2

Average influent water quality of the SANI pilot plant (after the strainer)

| Parameters | Mean Value ± Standard Deviation |
|---|---|
| SS (mg/L) | 280 ± 55.8 |
| VSS (mg/L) | 186 ± 55.3 |
| Alkalinity ($CaCO_3$ mg/L) | 223.6 ± 100.5 |
| Unfiltered COD (mg COD/L) | 430.9 ± 132.6 |
| Filtered COD (mg COD/L) | 157.9 ± 86.2 |
| $SO_4^{2-}$ (mg $SO_4^{2-}$—S/L) | 195.7 ± 18.0 |

By making use of the sulfate originated from seawater as the electron carrier, organic carbon is oxidized to carbon dioxide through the three cycles as shown in FIG. 4.

The pilot plant has been operated for 225 days under steady state conditions. Without passing through primary sedimentation, the pilot plant treated an influent with average quality of 431 mg COD/L, 280 mg SS/L and 87 mg TN/L, and produced an effluent with average quality of 54 mg COD/L, 36 mg SS/L, 3.4 mg $NH_4$—N/L and 16.8 mg $NO_3$—N/L, respectively. This is equal to an average of 87% COD and 87% TSS removal efficiencies. The TN removal efficiency was only 55%. This was partly due to a high proportion of soluble un-biodegradable organic nitrogen (26%) originating from the industrial source.

The pilot trial significantly minimized sludge production. No sludge was purposely withdrawn from the plant during the entire operation. As compared to conventional biological treatment processes, the pilot plant had 90% reduction of the sludge production. Of the remaining 10% sludge production, 84% was inorganic materials. The ratio of MLVSS to MLSS in a Sulfate Reducing Upflow Sludge Bed (SRUSB) was stable at 0.7 and the average sludge volume index (SVI) was constantly below 110 ml/g. As there is no primary sedimentation tank and no sludge handling facilities are required, the SANI can provide a low-cost solution for odour control in saline sewage treatment works.

EXAMPLE 2

Operation with Sulfite/Sulfide/Sulfate Cycle

Instead of sulfate, sulfite originated from the desulfurization unit of incinerators or fossil fuel power stations can be used as the electron carrier as shown in FIG. 5, which shows the three-cycle SANI process with sulfite/sulfide/sulfate cycle. A significant difference in the treatment system between Example 2 and Example 1 is the arrangement of the sulfur reducing reactor; this example is demonstrated by using the sulfur reducing reactor instead of the whole system. The upflow sulfur reducing granular sludge bed reactor has a diameter of 8.8 cm, height 50 cm, total volume of 3 L and effective volume of 2.85 L. The reactor was operated with a hydraulic retention time of 12 hours with internal recycle ratio of 5 for a period of 7 days, followed by data collection in three consecutive days.

The composition of the stock solution for the preparation of the synthetic wastewater is shown in Table 3. The total COD of the stock solution was 60,000 mg/L, following a COD:N:P ratio of 150:17:1. Instead of using seawater for providing the sulfate ion, the sodium sulfite solution was used as the electron carrier:

TABLE 3

Composition of the synthetic stock and trace solutions

| Component | Concentration (mg/L) |
|---|---|
| Stock Solution | |
| Glucose | 19570 |
| Sodium Acetate | 26100 |
| Yeast Extract | 9786 |
| $NH_4Cl$ | 18450 |
| $K_2HPO_4$ | 1920 |
| $KH_2PO_4$ | 720 |
| $MgCl_2 \cdot 6H_2O$ | 8320 |
| $CaCl_2$ | 5200 |
| $NaHCO_3$ | 62400 |
| Trace Solution | |
| $FeCl_3 \cdot 6H_2O$ | 2000 |
| $H_3BO_3$ | 200 |
| $CuSO_4$ | 50 |
| KI | 80 |
| $MnSO_4 \cdot 4H_2O$ | 250 |
| $ZnSO_4 \cdot 7H_2O$ | 150 |
| $CoCl_2 \cdot 6H_2O$ | 200 |

The measurements include influent and effluent TOC, total nitrogen, pH, alkalinity and sulfite, as well as effluent sulfate, thiosulfate and sulfide. The average influent and effluent TOC was 120 mg/L and 21 mg/L respectively, indicating an average TOC removal efficiency of 83%. The average influent $SO_3^{2-}$-S was 178 mg S/L, and the average S concentrations in the effluent were 14 mg $SO_3^{2-}$-S/L; 29 mg $SO_4^{2-}$-S/L, 6 mg $S_2O_3^{2-}$-S/L and 132 mg $S^{2-}$-S/L, representing an average of 102% in the sulfur balance. By using a rough estimate of COD:TOC ratio of 2.67 for glucose, the experiment achieved a COD balance of about 75%. This experiment fully demonstrated that sulfite can be used as the electron carrier for the oxidation of organic carbon with sulfite reduced to sulfide for the three-cycle SANI process.

EXAMPLE 3

Application of the Simplified SANI Process

A laboratory test of the simplified SANI system was conducted using synthetic saline wastewater simulating Hong Kong's saline sewage. The composition of the stock solution for the preparation of the synthetic wastewater is shown in Table 3. The total COD of the stock solution was 60,000 mg/L, following a COD:N:P ratio of 150:17:1. The stock solution was mixed with seawater (sulfate concentration: 2,700 mg/L, and chloride concentration: 19,000 mg/L) and diluted with tap water to achieve desired concentration of COD (400 mg/L).

The oxidation of organic carbon in the simplified SANI process was conducted by making use of the sulfate in seawater through the carbon and sulfur cycle as shown in FIG. 7. Apart from sulfate from seawater, other types of sulfur compounds can also be used as the electron carrier. For example, sulfate from sugarcane wastewater or acid mine drainage, as well as sulfite from the desulfurization units of a fossil fuel power station, can be used as the electron carrier.

Figure 14:
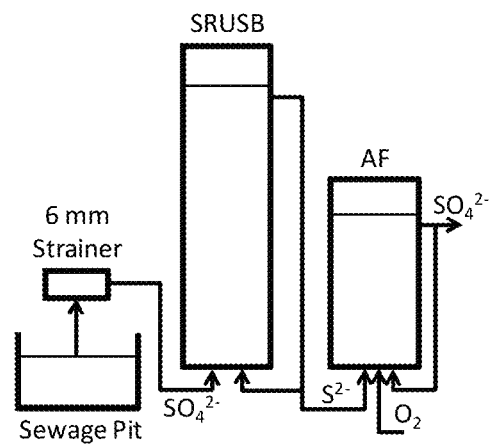
FIG. 14 is a diagram showing the design of the simplified SANI process.

The design of the simplified SANI process is shown in FIG. 14. The test SRUSB reactor had an internal diameter of 5.4 cm and height of 44 cm, with a total volume of 1 L. It was operated with a hydraulic retention time of 3 hr, and an internal recycling ratio of 4. The AF reactor had an internal diameter of 5.4 cm and height of 32 cm, with an effective volume of 400 mL. The AF reactor was operated with a HRT of 1.2 hour with no internal recycling.

Operating at the organic loading rate of 3.2 kg COD/$m^3$/day, the sulfate reducing reactor achieved an average COD removal efficiency of 89.3%. The dissolved sulfide concentration in the effluent was 114.7 mg $S^{2-}$-S/L while the sulfate difference between the influent and effluent was 128 mg $SO_4^{2-}$-S/L, corresponding to a sulfur balance of 89.6%.

In the autotrophic sulfur oxidation reactor, the sulfide generated in the sulfate reducing reactor was oxidized to sulfate. Apart from sulfide oxidation, part of the influent ammonia was nitrified to nitrate with an effluent ammonia concentration of 15.4 mg $NH_4$—N/L and nitrate concentration of 25.4 mg $NO_3$—N/L.

Overall, the simplified SANI laboratory reactor produced a final effluent of 25.2 mg COD/L and 47.2 mg SS/L, corresponding to 93.7% COD removal efficiency. The UV transmittance of final effluent was 75% at the wavelength of 254 nm. During the entire laboratory test, no excess sludge was withdrawn from the reactors.

EXAMPLE 4

Pilot Plant Operation of the Simplified SANI Process

A 10 $m^3$/day pilot-scale trial was conducted using Hong Kong's raw sewage, confirming that the simplified SANI system is operating satisfactorily with no sludge wastage required. The simplified SANI pilot plant (FIG. 14) was installed at the Tung Chung Sewage Pumping Station in Hong Kong where seawater toilet flushing was employed, with similar set-up as in Example 1. Comprised of an anaerobic sulfate reducing upflow sludge bed (SRUSB) and an aerobic biofilter (AF) for autotrophic sulfide oxidation, the pilot plant had been operated at steady state for about 100 days.

The design of the SRUSB and AF reactors, the influent wastewater and the seeding arrangements are the same as in Example 1. The operating conditions of the simplified SANI pilot plant at steady state after an acclimation period of about 1 month is shown in Table 4:

TABLE 4

Operating conditions of the SANI pilot plant at steady-state; HRT = hydraulic retention time and SRT = sludge retention time

| Reactor | Volume ($m^3$) | Flow, Q ($m^3$/day) | HRT (hr) | SRT (day) | Internal Recirculation |
|---------|----------------|---------------------|----------|-----------|------------------------|
| SRUSB   | 6.8            | 10                  | 16.3     | 90        | 3Q                     |
| AF      | 3.9            | 10                  | 9.4      | 42        | 3Q                     |

Operating at the organic loading rate of 0.63 kg COD/$m^3$/day, the SRUSB achieved an average COD removal efficiency of 77.1% during the steady state. The dissolved sulfide concentration in the effluent was 124.1 mg $S^{2-}$-S/L while the sulfate difference between the influent and effluent was 130.3 mg $SO_4^{2-}$-S/L, corresponding to a sulfur balance of 95%.

In the AF, all of the sulfide generated in the SRUSB was oxidized to sulfate. Apart from sulfide oxidation, part of the influent ammonia was nitrified to nitrate with an effluent ammonia concentration of 25.8 mg $NH_4$—N/L and nitrate concentration of 18.8 mg $NO_3$—N/L.

Overall, the simplified SANI pilot plant produced a final effluent of 63.4 mg COD/L and 42.1 mg SS/L, corresponding to an average of 85% COD and 85% SS removal efficiency. The UV transmittance of the final effluent was 75% at the wavelength of 254 nm, indicating its applicability for UV disinfection. During the entire pilot trial, no excess sludge was withdrawn from the simplified SANI pilot plant.

As the heterotrophic bacteria generally produce more sludge than autotrophic bacteria, the sludge production analysis was focused on the SRUSB. The average MLVSS in the SRUSB was about 3500 mg/L with an average MLVSS/MLSS ratio of 0.7 and sludge volume index (SVI) of below 110 mL/g. The observed yield coefficient of the SRUSB was 0.02 kg VSS/kg COD removed, representing 90% reduction of sludge production as compared with conventional secondary treatment. This also reaffirmed that no biological excess sludge removal from the SRUSB was required.

Energy consumption and $CO_2$ emission from a treatment plant were mainly contributed from two sources: operation and sludge disposal. As there was no excess sludge removal required, it is estimated that the simplified SANI process could reduce one-third of energy consumption and greenhouse gas emission as compared with conventional secondary treatment.

EXAMPLE 5

Operation with Sulfate Reducing Granular Sludge Bed Reactor

Figure 15:
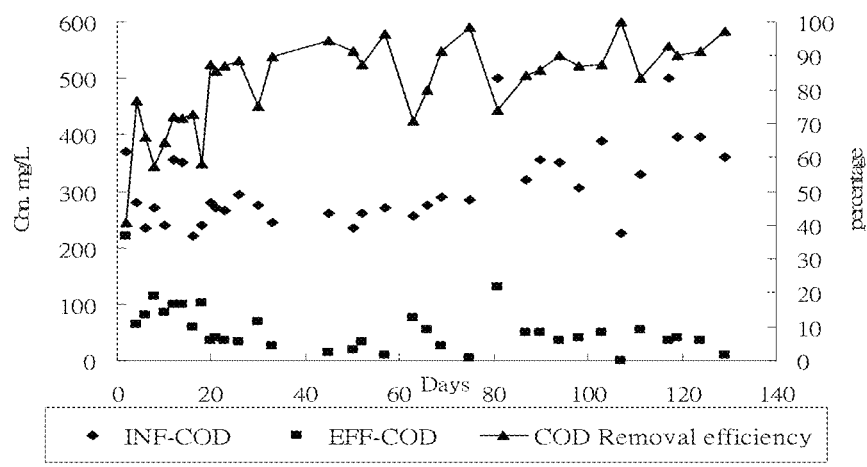
FIG. 15 is a chart showing performance of the upflow sulfate reducing granular sludge reactor chemical oxygen demand (COD) in influent and effluent, and COD removal efficiency.

A laboratory scale test was conducted using the sulfate reducing granular sludge bed reactor as detailed in Example 2. The upflow sulfur reducing granular sludge bed reactor had a diameter of 8.8 cm, height 50 cm, total volume of 3 L and effective volume of 2.85 L. FIG. 15 is a chart showing performance of the upflow sulfate reducing granular sludge reactor COD in influent and effluent, and COD removal efficiency. The chart shows the performance of the sulphate reducing granular sludge bed for an operation period of around 130 days.

The concentration of influent COD was around 300-350 mg/L while the effluent COD concentration was around 30 mg/L. The COD removal efficiency was stabilized at 90% after 80 days' operation, even when operated at a hydraulic retention time of 1 hour. Correspondingly, the majority of the sulfate ions (around 70%) were reduced to sulfide.

Figure 16A:
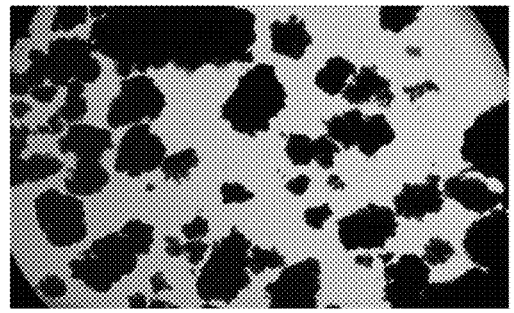
FIGS. 16a-d are a set of photomicrographs showing the appearance of sulfate reducing granular sludge.
Figure 16C:
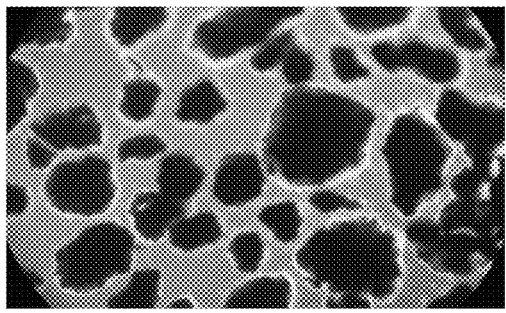
Figure 16B:
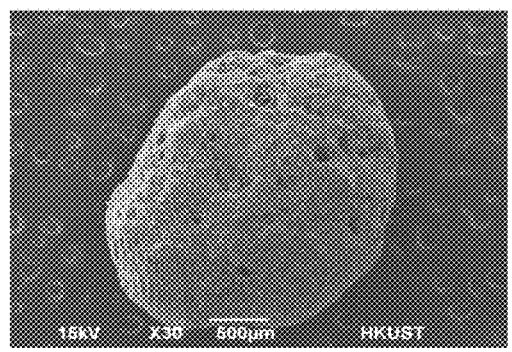
Figure 16D:
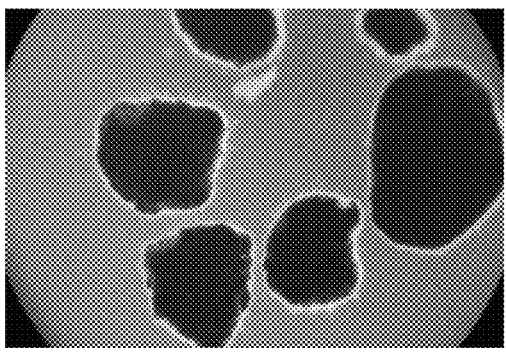

FIGS. 16a-d are a set of photomicrographs showing the appearance of granular sludge. FIG. 16a shows granulation at 30 days. FIG. 16b shows granulation at 30 days as viewed from an x-ray microscope. FIG. 16c shows granulation at 60 days. FIG. 16d shows granulation at 90 days. The microscopic investigations indicated that all the sludge turned into granules within 2 months. The granules are spherical in shape with a very clear outline, with an average diameter of around 2 mm.

Figure 17A:
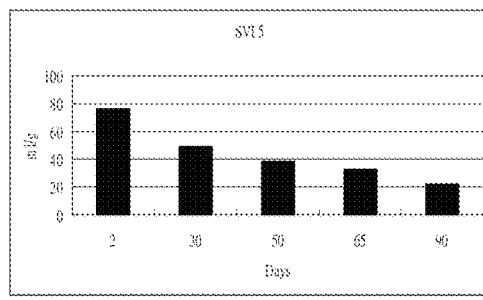
FIGS. 17a and 17b are charts showing the 5-minute Sludge Volumetric Index (SVI5) and the particle size of the sludge over the acclimation period.
Figure 17B:
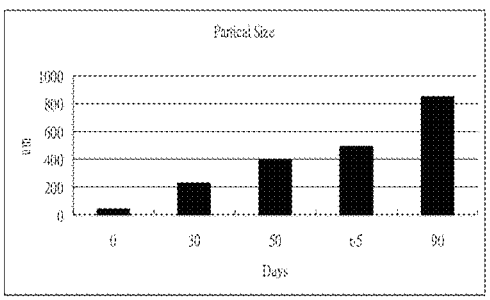

FIGS. 17a and 17b are charts showing the 5-minute Sludge Volumetric Index ($SVI_5$) and the particle size of the sludge over the acclimation period. The $SVI_5$ of the seeding sludge was 80 mL/g with particle size of 44 μm in diameter. Most of the sludge appeared as flocs within the first 15 days. Granules started to form after 30 days. Following the acclimation, the $SVI_5$ decreased and particle size increased, and the reactor performance turned stable after 60 days of operation.

EXAMPLE 6

Autotrophic Sulfide Oxidation Granular Sludge Bed Reactor

To demonstrate the use of granular sludge for autotrophic sulfide oxidation, a laboratory Autotrophic Denitrification (AD) Granular Sludge Bed Reactor was constructed. The Autotrophic Denitrification (AD) Granular Sludge Bed Reactor had a diameter of 6.2 cm, height of 33.5 gm, total volume of 0.95 L and an effective volume of 0.85 L. The reactor was inoculated with sludge obtained from an anaerobic sludge digester of a local sewage treatment works treating saline sewage.

The experiment was conducted by using two synthetic wastewaters containing sodium nitrate at 30 mg N/L and sodium sulfide at 60 mg S/L respectively. During days 1-60 (i.e., Stage 1), both types of wastewater were added to attend the required loading rate as shown in Table 5. During days 61-130 (Stage 2), the synthetic sulfide feed was replaced by using the effluent from the sulfate reducing granular sludge bed reactor as shown in Example 5 above.

TABLE 5

Operational Condition of the Autotrophic Denitrification Reactor

|  | Stage 1 (Day 1-60) | Stage 2 (Day 61-130) |
| --- | --- | --- |
| Hydraulic Retention Time | 4 hours | 2 hours |
| Internal Recycling Ratio | 5 | 5 |
| Nitrogen Loading (kg $NO_3^-$—N/m³ day) | 0.09 | 0.18 |
| Sulfide Loading (kg $S^{2-}$—S/m³ day) | 0.18 | 0.36 |

Figure 18A:
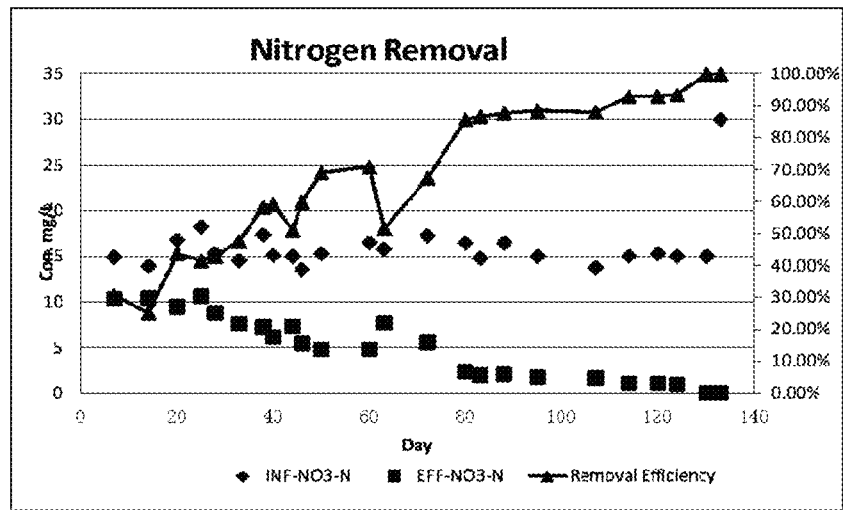
Figure 18B:
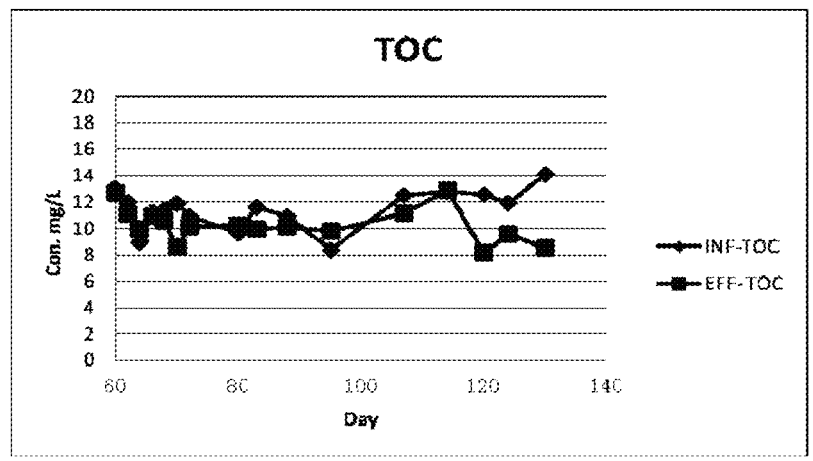

FIGS. 18a and 18b are charts showing performance of the autotrophic denitrification reactor. The influent and effluent nitrate concentrations, as well as nitrate removal efficiency are shown in FIG. 18a. The influent nitrate nitrogen was about 15 mg $NO_3^-$-N/L. The effluent $NO_3^-$-N concentration gradually reduced from 10 to 1 mg/L with removal efficiency increased from about 30% at the beginning to over 90% at the end of the stage 2. As mentioned above, from day 1 to day 60, the reactor was fed by synthetic wastewater and from day 60 to the end of stage 2, it was fed with effluent which contains sulfide and sulfate from the sulfate reducing reactor. The sulfide was oxidized to sulfate by nitrate. FIG. 18b shows total organic carbon (TOC) in the effluent. As can be seen from FIG. 18b, during the entire experiment, the TOC in the influent and effluent were almost the same, indicating that the denitrification reaction conducted was autotrophic instead of heterotrophic.

Figure 19:
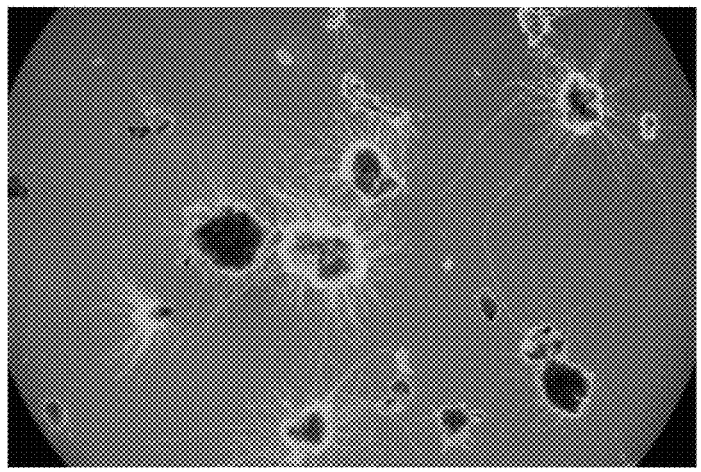
FIG. 19 is a photomicrograph showing sludge granules from the autotrophic denitrification reactor at day 65.
Figure 20:
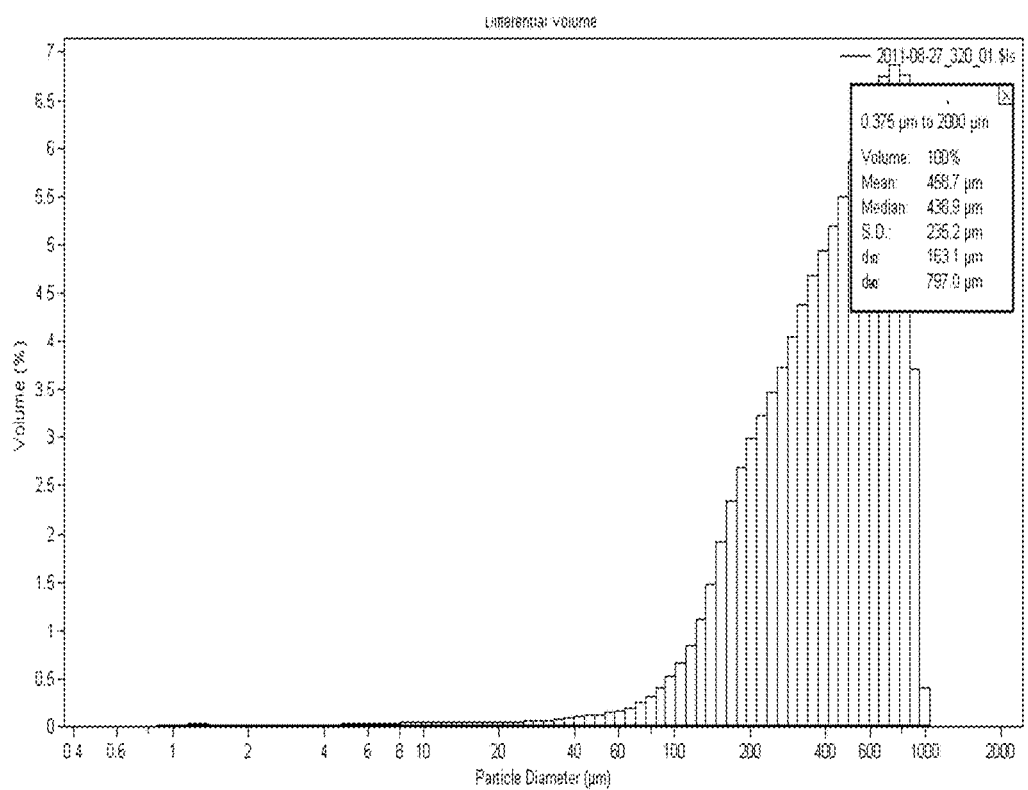
FIG. 20 is a chart showing particle size distribution of the sludge granules in the autotrophic denitrification reactor.

Sludge samples were collected from the reactor on Day 65 for light microscopy and particle size distribution analysis. FIG. 19 is a photomicrograph showing sludge granules from the autotrophic denitrification reactor at day 65. FIG. 20 is a chart showing particle size distribution of the sludge granules in the autotrophic denitrification reactor. The sludge granules were observed as shown in the figure, with a mean diameter of roughly 0.5 mm.

EXAMPLE 7

Operation with Heterotrophic Oxidation SANI Process

Figure 21:
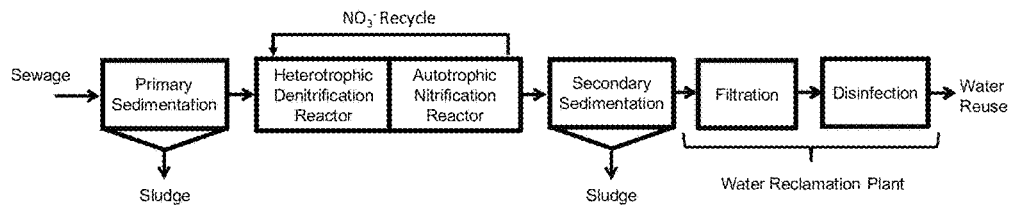
FIG. 21 is a schematic diagram showing a conventional biological nitrogen removal and water reclamation plant.

FIG. 21 is a schematic diagram showing a conventional biological nitrogen removal and water reclamation plant. The application of the heterotrophic oxidation SANI process can be illustrated by means of engineering calculations. Under consideration is a sewage treatment plant which requires providing biological nitrogen removal to meet the effluent requirement and to provide ⅓ of its treated sewage for a water reclamation plant for providing reclaimed water for street and car washing as well as landscape irrigation purposes. The sewage treatment processes required include a primary sedimentation tank, a biological carbon and nitrogen removal process, a secondary sedimentation tank, sludge thickening, sludge digestion, sludge dewatering and sludge incineration. This is followed by a water reclamation plant equipped with filtration and disinfection unit.

Figure 22:
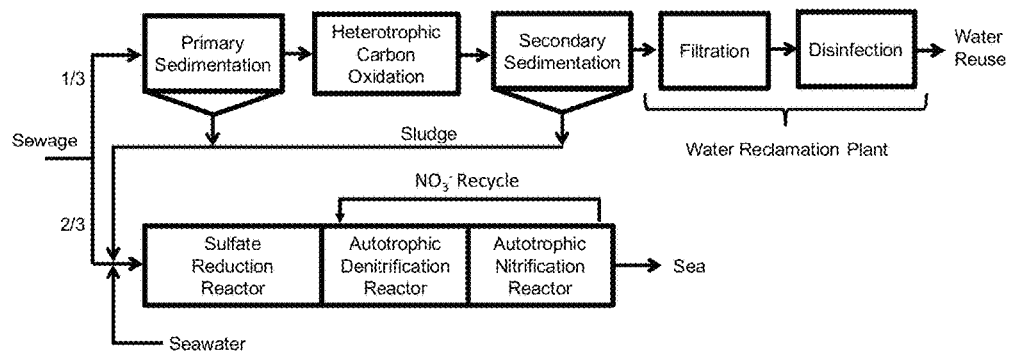
FIG. 22 is a schematic diagram showing the complete heterotrophic oxidation SANI process.

FIG. 22 is a schematic diagram showing complete heterotrophic oxidation SANI process. As nitrogen removal is not needed for street and car washing as well as landscape irrigation, it is possible to eliminate the nitrogen removal process in the water reuse stream. It is possible to also eliminate ⅔ of the primary and secondary sedimentation tanks as the SANI process does not require sedimentation through adopting an upflow sludge bed for the sulfate reducing reactor, and adopting biological filter for autotrophic nitrification and denitrification. A centrifugal pump may be installed to abstract seawater to provide sulfate for SANI process.

Assuming that the COD of the incoming sewage is 400 mg/L, to ensure complete oxidation of the organic carbon through sulfate reduction, 600 mg/L of $SO_4^{2-}$ is added to the sewage. Depending on the salinity of the sea, seawater contains about 2600 mg $SO_4^{2-}$/L. Hence, addition of seawater required would be around 0.25 m³/m³ of sewage treated. This is equal to an addition of ¼ of total sewage flow to the system and shall be acceptable as it is well below the standard peaking factor of a sewage treatment plant. Assuming the head loss for pumping seawater from the seafront to the inlet chamber of the sewage treatment plant was 15 m, the power consumption would be 0.06 kWh/m³ of seawater pumped. As it is only required to provide 0.25 m³ of seawater per m³ of sewage treated, the additional power consumption for pumping of seawater would be around 0.015 kWh/m³ of sewage treated.

As sludge dewatering and incineration is energy consuming, by eliminating the sludge handling and incineration process with the SANI process, it would result in about one third of energy saving and greenhouse gas emission as compared with conventional biological nitrogen removal process. As compared with activated sludge nitrogen removal process, this is equivalent to an energy saving of about 0.15 kWh/m$^3$ of sewage treated, or ten times more than the additional energy required for pumping seawater to the heterotrophic oxidation SANI reactors.

Overall, by adopting the heterotrophic oxidation SANI process, it would save ⅔ of the primary and secondary sedimentation tanks, replace ⅓ of biological nitrogen removal process train with a simpler biological carbon removal process train, and eliminate most of the sludge handling and disposal facilities. It would also replace ⅔ of the conventional nitrogen removal process by the SANI process, together with a pumping system to provide seawater. Based on a very rough estimation, this would result in the reduction of 50% of the cost and about 30% of the energy consumption and greenhouse gas emission.

EXAMPLE 8

Operation with a Simplified Heterotrophic Oxidation SANI Process

Figure 23:
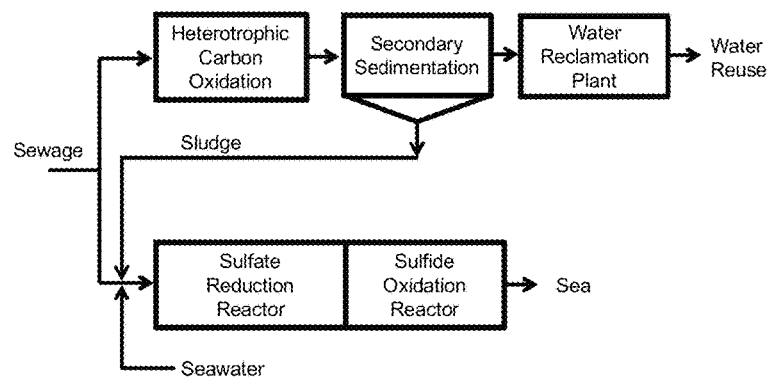
FIG. 23 is a diagram showing a simplified heterotrophic oxidation SANI process.

FIG. 23 is a diagram showing a simplified heterotrophic oxidation SANI process. The heterotrophic oxidation SANI system is an integration of a conventional biological water reclamation plant and a modified SANI process. As the first stream, i.e., heterotrophic carbon oxidation, secondary sedimentation and water reclamation plant is a standard water reuse design, there is no need to conduct separate tests to demonstrate its applicability. For the second stream, it involves the modification of the SANI process to degrade primary and secondary sludge, in addition to sewage. As shown in Example 1, the SANI process has been successful used for degradation of raw sewage, which contains primary sludge inherently. Nevertheless, whether secondary sludge can be effectively degraded in the sulfate reducing reactor needs to be confirmed. Once the secondary sludge is degraded in the sulfate reducing reactor, the oxidation of sulfide to sulfate again in the autotrophic oxidation step would not be an issue.

To test the applicability of the heterotrophic oxidation SANI process, an upflow sulfate reduction granular sludge bed reactor was used to degrade secondary sludge together with the sewage. In this arrangement, an upflow sulfur reducing granular sludge bed reactor was configured with a diameter of 8.8 cm, height 50 cm, total volume of 3 L and effective volume of 2.85 L. The reactor was operated with a hydraulic retention time of 12 hours with internal recycle ratio of 5 for a period of 14 days, followed by data collection in three consecutive days.

To simulate the degradation process, the influent was prepared by mixing the stock solution in Table 3 together with secondary sludge from a local secondary treatment plant treating saline sewage in order to achieve an influent with a total COD of about 500 mg/L, of which 70% (350 mg COD/L) came from the feed stock while the remaining 30% (150 mg COD/L or 100 mg VSS/L) came from the secondary sludge. Seawater from the seawater toilet flushing system was used to provide the sulfate ion as the electron carrier.

The measurements include influent and effluent soluble and particulate COD, VSS, sulfate, VFA, pH, alkalinity, as well as effluent sulfide. The average influent and effluent quality is tabulated in Table 6.

TABLE 6

Performance of the Sulfur Reducing Granular Sludge Bed Reactor Treating a Synthetic Wastewater With Secondary Sludge

| Parameter | Influent | Effluent | Removal |
|---|---|---|---|
| Total COD (mg/L) | 502 | 169 | 333 (66%) |
| Soluble COD (mg/L) | 250 | 98 | 152 (61%) |
| Particulate COD (mg/L) | 252 | 70 | 182 (72%) |
| TSS (mg/L) | 351 | 107 | 244 (71%) |
| VSS (mg/L) | 252 | 59 | 163 (77%) |
| Alkalinity (mgCaCO$_3$/L) | 165 | 699 | |
| Sulfate (mgSO$_4^{2-}$—S/L) | 293 | 127 | 166 (57%) |
| Sulfide (mgS$^{2-}$—S/L) | | 142 | |

The overall COD removal was 333 mg/L (or 66%) while the VSS removal efficiency was 77%. The total sulfur in the effluent was 269 mg S/L, representing a S balance of 92%. As 1 mg SO$_4^{2-}$-S converting to 1 mg S$^{2-}$-S is equal to 2 mg COD, the sulfur balance indicates roughly 284-332 mg COD reduction, representing an overall 92%-100% COD balance. This value was also much higher than the soluble COD reduction in the reactor. The data indicated that the secondary sludge is effectively degraded instead of being accumulated in the reactor. This experiment fully demonstrated the applicability of the sulfate reducing reactor in treated a combined sewage+secondary activated sludge. This also demonstrated the possibility of applying the heterotrophic oxidation SANI process in treating domestic wastewater.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method of biological wastewater treatment of influent containing organic carbon, the method comprising:
    oxidizing the organic carbon to carbon dioxide with sulfur or a sulfur compound comprising a material selected from the group consisting of sulfates, sulfites, thiosulfates and sulfur, or a material obtained from the influent, wherein the influent contains a substantial saline component, and reducing the sulfur or sulfur compound to sulfide in a first upflow sludge bed reactor, with only liquid phase in the first upflow sludge bed reactor without gas phase, with mixing performed by recirculation of fluid in the first reactor and generating turbulence within the first reactor by causing recirculation within the first reactor to increase a vertical liquid velocity and a liquid flow restriction device to generate turbulence within the first reactor to significantly enhance sludge movement in the first reactor, thereby generating a shear force to enhance biomass growth into dense and strong sludge granules; and
    oxidizing the sulfide to sulfate by oxygen or nitrate in a second reactor.

2. The method of claim 1, further comprising,
    oxidizing sulfide to sulfate by oxygen; and
    oxidizing ammonia to nitrate with oxygen in the second reactor.

3. The method of claim 1, comprising:
    oxidizing the sulfide to sulfate using nitrate in the second reactor;
    providing autotrophic nitrification in a third reactor, said autotrophic nitrification comprising oxidizing ammonia to nitrate in the third reactor; and recycling the nitrate from the third reactor to the second reactor.

4. The method of claim 1, further comprising:
reducing the sulfur or sulfur compound to sulfide in an upflow granular sludge bed reactor provided as the first reactor, and /or oxidizing the sulfide to sulfate using oxygen or nitrate in an upflow granular sludge bed reactor provided as the second reactor;
oxidizing ammonia to nitrate in the third reactor and recycling the nitrate back to the second reactor; and
reducing said nitrate to nitrogen gas.

5. A method of biological wastewater treatment of influent containing organic carbon, the method comprising:
providing a parallel stream for biological treatment, integrated as follows:
in a first stream, oxidizing the organic carbon to carbon dioxide by oxygen or nitrate, and reclaiming treated effluent of this stream by means of additional treatment steps selected from the group consisting of filtration and disinfection;
in a second stream, oxidizing the organic carbon to carbon dioxide by using a sulfur or sulfur compounds selected from sulfates, sulfites and thiosulfates or obtained from substantial saline component, and reducing said sulfur or sulfur compounds to sulfide through sulfur reducing bacteria in a first upflow sludge bed reactor without further addition of external electron carrier, with only liquid phase in the first upflow sludge bed reactor without gas phase, with mixing performed by recirculation of fluid in the first reactor and generating turbulence within the first reactor by causing recirculation within the first reactor to increase a vertical liquid velocity by using a liquid flow restriction device to increase a vertical velocity of liquid to significantly enhance sludge movement in the first reactor, thereby generating a shear force to enhance biomass growth into dense and strong sludge granules, and followed by oxidizing said sulfide to sulfate by oxygen or nitrate in a second reactor, oxidizing ammonia to nitrate through autotrophic nitrification in a third reactor, and recycling the nitrate from the third reactor back to the second reactor.

6. The method of claim 5, further comprising:
obtaining sludge produced in the first stream; and
transferring said sludge for co-treatment with the incoming wastewater in the second stream.

7. A biological wastewater treatment plant for treatment of influent containing organic carbon, comprising:
a first reactor provided as an upflow sludge bed reactor configured to oxidize the organic carbon to carbon dioxide with sulfur or a sulfur compound comprising a material selected from the group consisting of sulfates, sulfites, thiosulfates and sulfur, or a material obtained from an influent containing a substantial saline component, and to reduce said sulfur or sulfur compound to sulfide without further addition of external electron carrier, with only liquid phase in the first upflow sludge bed reactor without gas phase and mixing performed by recirculation of fluid in the first reactor and generating turbulence within the first reactor;
a recirculation device within the first reactor to increase a vertical liquid velocity and a liquid flow restriction device to generate turbulence within the reactor and thereby increase a vertical velocity of liquid to significantly enhance sludge movement in the first reactor, thereby generating a shear force to enhance biomass growth into dense and strong sludge granules; and
a second reactor configured to oxidize said sulfide to sulfate with oxygen or nitrate.

8. The biological wastewater treatment plant of claim 7, further comprising said plant further configured to oxidize ammonia to nitrate in the second reactor.

9. The biological wastewater treatment plant of claim 7, further comprising:
a third reactor configured to provide autotrophic nitrification by oxidizing ammonia to nitrate, and further configured to recycle nitrate from the third reactor back to the second reactor to oxidize the sulfide to sulfate with the oxygen or nitrate,
said reactor configured to oxidize sulfide to sulfate also configured to reduce nitrate to nitrogen gas.

10. The biological wastewater treatment plant of claim 8, further comprising:
a fourth reactor configured for reclamation of treated effluent from oxidation of the organic carbon by oxygen or nitrate, by means of additional steps of treatment processes selected from the group consisting of filtration and disinfection.

11. The biological wastewater treatment plant of claim 10, further configured to transfer sludge arising from the oxidation of the organic carbon by oxygen or nitrate, to combine with the incoming wastewater for oxidation of the organic carbon to carbon dioxide with sulfur or a sulfur compound, and reduce said sulfur or sulfur compound to sulfide.

12. The biological wastewater treatment plant of claim 10, further configured to oxidize ammonia to nitrate.

13. The biological wastewater treatment plant of claim 11, further configured to oxidize ammonia to nitrate.

14. A method of biological wastewater treatment of influent containing organic carbon, the method comprising:
oxidizing the organic carbon to carbon dioxide with sulfur or a sulfur compound comprising a material selected from the group consisting of sulfates, sulfites, thiosulfates and sulfur, or a material obtained from the influent, wherein the influent contains a substantial saline component, and reducing the sulfur or sulfur compound to sulfide in a first upflow sludge bed reactor without further addition of external electron carrier, with only liquid phase in the first upflow sludge bed reactor without gas phase, with mixing performed by recirculation of fluid in the first reactor and a liquid flow restriction device generating turbulence within the first reactor by increasing a vertical liquid velocity to significantly enhance sludge movement in the first reactor, thereby generating a shear force to enhance biomass growth into dense and strong sludge granules; and
oxidizing the sulfide to sulfate by oxygen or nitrate in a second reactor.

15. The method of claim 14, further comprising,
oxidizing sulfide to sulfate by oxygen; and
oxidizing ammonia to nitrate with oxygen in the second reactor.

16. The method of claim 14, comprising:
oxidizing the sulfide to sulfate using nitrate in the second reactor;
providing autotrophic nitrification in a third reactor, said autotrophic nitrification comprising oxidizing ammonia to nitrate in the third reactor; and
recycling the nitrate from the third reactor to the second reactor.

17. The method of claim 14, further comprising:
reducing the sulfur or sulfur compound to sulfide in an upflow granular sludge bed reactor without the further addition of external electron carrier, the upflow granular sludge bed reactor provided as the first reactor, and/or oxidizing the sulfide to sulfate using oxygen or nitrate in an upflow granular sludge bed reactor provided as the second reactor;

oxidizing ammonia to nitrate in the third reactor and recycling the nitrate back to the second reactor; and reducing said nitrate to nitrogen gas.

* * * * *